United States Patent
Sakamoto et al.

(10) Patent No.: US 6,953,062 B2
(45) Date of Patent: Oct. 11, 2005

(54) FUEL TANK OR FUEL PIPE EXCELLENT IN CORROSION RESISTANCE AND METHOD FOR PRODUCING THE SAME

(75) Inventors: Shunji Sakamoto, Kitakyushu (JP); Akihiko Takahashi, Kitakyushu (JP); Michio Kaneko, Futtsu (JP); Toshio Tanoue, Tokyo (JP); Kenji Kato, Futtsu (JP); Naoto Ono, Hikari (JP); Masao Kikuchi, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 155 days.

(21) Appl. No.: 10/343,721

(22) PCT Filed: Feb. 4, 2002

(86) PCT No.: PCT/JP02/00895

§ 371 (c)(1),
(2), (4) Date: Jan. 31, 2003

(87) PCT Pub. No.: WO02/099154

PCT Pub. Date: Dec. 12, 2002

(65) Prior Publication Data

US 2003/0196715 A1 Oct. 23, 2003

(30) Foreign Application Priority Data

Jun. 1, 2001 (JP) ..................................... 2001-167123
Oct. 10, 2001 (JP) ..................................... 2001-313070

(51) Int. Cl.⁷ ............................. F16L 9/14; B23B 15/00
(52) U.S. Cl. ..................... 138/142; 138/143; 138/146; 428/659; 428/626; 428/685; 428/653; 428/553; 428/937; 220/562; 220/687; 220/62.17
(58) Field of Search ............................. 138/142, 143, 138/146, 171; 428/659, 626, 685, 653, 553, 937; 220/562, 678, 62.17

(56) References Cited

U.S. PATENT DOCUMENTS

| | | | | |
|---|---|---|---|---|
| 3,859,061 A | * | 1/1975 | Speirs et al. | 428/614 |
| 3,922,396 A | * | 11/1975 | Speirs et al. | 148/529 |
| 4,125,646 A | * | 11/1978 | Dean et al. | 427/253 |
| 4,816,348 A | * | 3/1989 | Kawamura et al. | 428/629 |
| 4,885,215 A | * | 12/1989 | Yoshioka et al. | 428/632 |
| 4,942,922 A | * | 7/1990 | Redmerski et al. | 165/134.1 |
| 5,413,754 A | * | 5/1995 | Yazawa et al. | 420/41 |
| 5,584,428 A | * | 12/1996 | Satoh et al. | 228/194 |
| 6,003,562 A | * | 12/1999 | Iorio et al. | 138/138 |
| 6,276,400 B1 | * | 8/2001 | Jackson et al. | 138/143 |
| 6,296,953 B1 | * | 10/2001 | Linden et al. | 428/681 |
| 6,623,869 B1 | * | 9/2003 | Nishiyama et al. | 428/685 |
| 6,673,472 B2 | * | 1/2004 | Maki et al. | 428/653 |

FOREIGN PATENT DOCUMENTS

| | | |
|---|---|---|
| JP | 2000-240855 | 9/2000 |
| JP | A-2002-211255 | 7/2002 |

* cited by examiner

*Primary Examiner*—James Hook
(74) *Attorney, Agent, or Firm*—Kenyon & Kenyon

(57) ABSTRACT

The present invention provides a fuel tank or a fuel pipe excellent particularly in the corrosion resistance of the outer surface in a salt damage environment, and is a fuel tank or a fuel pipe excellent in corrosion resistance characterized by: being formed by using a steel sheet or a steel pipe containing Cr of 9.0 to 25.0 mass % as the base material; on the outer surface thereof, having any one or more of welded portions, brazed portions and structurally gapped portions contacting components; and having one or more of metals, whose electrode potential in a 5%-NaCl aqueous solution at 30° C. is −0.4 V or less relative to a saturated calomel electrode, attached to at least a part or parts of said portion(s) of the outer surface in an electrically conductive manner.

17 Claims, 4 Drawing Sheets

US 6,953,062 B2

FUEL TANK OR FUEL PIPE EXCELLENT IN CORROSION RESISTANCE AND METHOD FOR PRODUCING THE SAME

TECHNICAL FIELD

The present invention relates to fuel-related members including the fuel tank and the fuel pipes of an automobile as the main examples and, more specifically, to a fuel tank and a fuel pipe excellent in the corrosion resistance of the outer surfaces in a salt-damage environment.

BACKGROUND ART

The latest calls for the environmental protection and the reduction of the life cycle costs of commodities have had repercussions on fuel related members, such as a fuel tank, a fuel pipe and the like, which are components of an automobile.

A tank produced by using a lead-plated steel sheet as the base material and applying paint coating thereto has long been used practically as the fuel tank of an automobile, but, in view of the latest requirements for the environmental protection, new base materials free of lead are being developed. In addition, taking a serious view of the environmental impact of painting work itself, the needs for the elimination of the painting which has been deemed indispensable for the conventional plated steel sheets have arisen.

As a background to the above movements, there is a situation in which the LEV-II regulation is to be prescribed in California, U.S.A. in 2002 and carmakers will be obliged to guarantee the service life of a fuel tank for 15 years of use or through 150,000 miles of running.

Research and development activities are under way at present to develop a fuel tank satisfying the regulation, focusing on the following three alternative base materials: a plated steel material, on the premise that painting is applied as stated above, a resin and a stainless steel on the premise that painting is not applied. Among the three base materials, the resin has a problem in recyclability, and the plated steel material requires heavy painting and therefore is liable to raise the costs and to reproduce the environmental problems.

Consequently, what is attracting attention at present is a fuel tank produced by using a stainless steel type base material which has no problem with respect to the corrosion resistance of the inner surface. Attempts are being made along this line of thought to minimize the cost/performance by eliminating the painting work which has been deemed indispensable for securing the corrosion resistance of the outer surface of a conventional plated steel material while the good recyclability of a ferrous material is maintained.

The portion liable to a problem regarding the corrosion resistance of an outer surface in the environment of deicing salt is a welded portion inevitably involved in the fabrication of a fuel tank. Even though non-welded portions have good corrosion resistance, a welded portion has the danger of generating local corrosion such as pitting corrosion, crevice corrosion and stress corrosion cracking (SCC) because the corrosion resistance of a stainless steel base material is significantly damaged by the destruction of a passivated film formed on the surface of the base material or the formation of gapped portions which are caused by the welding.

Multipurpose austenitic stainless steel such as SUS304L is considered a candidate material for solving the above problems, but a shortcoming with the material is that SCC is generated under a salt damage condition. In view of the above problem, ferritic stainless steel is useful as a material for avoiding the SCC problem. However, the material containing small amounts of alloying elements such as Cr and Mo does not always exhibit sufficient corrosion resistance in a salt damage environment.

The extended service life as described above is required not only of a fuel tank but also of a fuel pipe. A fuel pipe undergoes bending and expansion work, then brazing or welding work and assembly with metal fittings, and, as a result, gapped portions are formed. Thus, a fuel pipe has the problem of local corrosion on the outer surface just like a fuel tank.

As explained above, when stainless steel is used for the fuel related members of an automobile, although the corrosion problem of the inner surface exposed to a fuel environment is avoided, the resistance against the local corrosion such as pitting corrosion, crevice corrosion and SCC of the outer surface exposed to deicing salt constitutes a problem requiring solution.

DISCLOSURE OF THE INVENTION

The object of the present invention is to provide a technology of overcoming the above problems and, in particular, to provide a means to solve the problem of the local corrosion at a welded portion, a brazed portion, a gapped portion and the like of a fuel tank or a fuel pipe made of stainless steel.

The present inventors produced welded test pieces simulating the fabrication of a fuel tank using the sheets of various stainless steels as the base materials and evaluated their corrosion properties at the welded portions and the gapped portions.

As a result, the present inventors found that, when the test was carried out in an as-welded state under a severe test environment, commercially available multipurpose stainless steels such as SUS430 and SUS304 steels generated local corrosion such as pitting corrosion, crevice corrosion and SCC within a short period of time and, further, even SUS444 and SUS316 steels wherein the contents of alloying elements of the base materials were increased could not completely prevent the local corrosion, although the degree of the local corrosion was mitigated to some extent.

From the above finding, it is necessary to provide some sort of anticorrosive measure for avoiding the corrosion problem of a stainless steel fuel tank for a long period of time. This applies not only to a fuel tank but also to a fuel pipe which is exposed to the same environment as a fuel tank.

The present inventors, as a result of variously studying anticorrosive methods, concluded that the only way to realize the high reliability of a fuel tank and a fuel pipe was to apply an anticorrosive treatment after the fuel tank and the fuel pipe are fabricated, and that it was most effective and practical to attach an electrochemically baser metal to a corrosive portion such as a welded portion and a gapped portion in the state to secure electric conductivity.

The present inventors also found that Zn, Al, Mg or an alloy of these elements was effective as the metal to be attached.

It is known that Zn, Al and Mg are the elements baser than a steel base material and are the elements having a cathodic protection function whereby the elements are corroded by themselves and thus the steel base material is protected from corrosion, and that an alloy of these elements has the same cathodic protection effect. The cathodic protection effect has been applied to ships, offshore structures and the like for a long time.

However, a cathodic protection effect is realized only when an appropriate cathodic protection current is secured, and, under the condition that a liquid film formed on the surface of a fuel tank or a fuel pipe in a salt damage environment is very thin, there may be the case where a sufficient cathodic protection current is not secured because the electrical resistance is high. Therefore, the present inventors realized that the cathodic protection effect alone was not enough for preventing local corrosion completely.

This was confirmed through the fact that, when ordinary steels to which Zn, Al and Mg were attached were subjected to a cyclic corrosion test wherein wetting and drying were repeated and a saltwater immersion test and the results of the two tests were compared, good corrosion protection was realized in the saltwater immersion test but an anticorrosive effect was scarcely obtained in, the cyclic corrosion test wherein a sufficient cathodic protection current could not be secured because the liquid film was thin.

However, when the same comparative tests were carried out by changing the ordinary steel materials to stainless steels, the anticorrosive effects were substantially the same in the saltwater immersion test and the cyclic corrosion test. This means that, in the case where the base material is a stainless steel material, a metal for the cathodic protection shows another anticorrosive effect in addition to the simple cathodic protection effect. As a result of investigating and analyzing the cause, the present inventors found that the corrosion product generated by the self corrosion of an attached metal had the function of raising the value of pH and, as a consequence, the surface of a steel base material was kept alkalescent environment, and that, whereas the corrosion was not mitigated even in an alkalescent environment when the base material was an ordinary steel, the local destruction of the passivated films was significantly suppressed by a slight rise in the pH value and the corrosion was mitigated when the base material was a stainless steel.

This means that, when a metal for cathodic protection is attached to a stainless steel material, two kinds of anticorrosive effects, namely one by the cathodic protection current and the other by the rise in the pH value, are obtained and, as a result, anticorrosion is realized by the effect of the rise in the pH value even in a cyclic corrosion test wherein the liquid film is thin and the cathodic protection current is low. In addition, the present inventors found that, among the conditions which were required of a stainless steel base material for enjoying the effect of the rise in the pH value, the most important factor was the content of Cr.

As stated above, the present inventors made it clear that, in the special environmental condition that an automobile is exposed to a salt damage environment, the attachment of Zn, Al, Mg or an alloy of these elements worked effectively only to a stainless steel material containing an adequate amount of Cr. They also clarified the composition of a metal to be attached and the manner of attaching the metal which were suitable for realizing said two kinds of anticorrosive effects more stably.

The present invention is constructed based on the above findings, and the gist of the present invention is as follows.

(1) A fuel tank or a fuel pipe excellent in corrosion resistance characterized by: being formed by using a steel sheet or a steel pipe containing Cr of 9.0 to 25.0 mass % as the base material; on the outer surface thereof, having any one or more of welded portions, brazed portions and structurally gapped portions contacting components; and having one or more of metals, whose electrode potential in a 5%-NaCl aqueous solution at 30° C. is −0.4 V or less relative to a saturated calomel electrode, attached to at least a part or parts of said portion(s) of the outer surface in an electrically conductive manner.

(2) A fuel tank or a fuel pipe excellent in corrosion resistance according to the item (1), characterized in that a metal attached to the outer surface of the fuel tank or the fuel pipe consists of one or more of Zn, Al and Mg in terms of the substantial chemical components excluding unavoidable impurities.

(3) A fuel tank or a fuel pipe excellent in corrosion resistance according to the item (1), characterized in that a metal attached to the outer surface of the fuel tank or the fuel pipe contains Zn of 10 mass % or more, with the balance substantially consisting of Al.

(4) A fuel tank or a fuel pipe excellent in corrosion resistance according to the item (1), characterized in that a metal attached to the outer surface of the fuel tank or the fuel pipe contains, in mass, Zn of 10% or more and further one or more of Si of 1 to 10%, Sn of 1 to 10% and Mg of 1 to 10%, with the balance substantially consisting of Al.

(5) A fuel tank or a fuel pipe excellent in corrosion resistance according to the item (4), characterized in that the metal contained in a substance attached to the outer surface of the fuel tank or the fuel pipe further contains one or more kinds of intermetallic compounds composed of Mg and Si or Mg and Sn.

(6) A fuel tank or a fuel pipe excellent in corrosion resistance according to any one of the items (1) to (5), characterized in that an attached metal is in the form of foil 10 $\mu$m or more in thickness.

(7) A fuel tank or a fuel pipe excellent in corrosion resistance according to the item (6), characterized by forming a layer of an organic or inorganic substance which suppresses the elution of the metal on the surface of a metal foil.

(8) A fuel tank or a fuel pipe excellent in corrosion resistance according to any one of the items (1) to (5), characterized in that a metal attached to the outer surface of the fuel tank or the fuel pipe is in the form of thermally sprayed particles and the metal is attached as a film 10 $\mu$m or more in thickness having a laminated structure.

(9) A fuel tank or a fuel pipe excellent in corrosion resistance according to the item (8), characterized by forming a layer of an organic or inorganic substance on the surface of a film having a laminated structure and being composed of metal powder or particles or in the voids in the film.

(10) A fuel tank or a fuel pipe excellent in corrosion resistance according to any one of the items (1) to (5), characterized by forming a film or films 10 $\mu$m or more in thickness, each of which consists of metal powder or particles 1 to 100 $\mu$m in average grain size and a resin and has a metal content of 75 mass % or more, on the outer surface of the fuel tank or the fuel pipe.

(11) A fuel tank or a fuel pipe excellent in corrosion resistance according to the item (10), characterized in that the resin contains urethane bonds.

(12) A method for producing a fuel tank or a fuel pipe excellent in corrosion resistance characterized by: subjecting a steel sheet or a steel pipe containing Cr of 9.0 to 25.0 mass %, which is used as the base material, to a cold plastic working; joining or fixing components; and thereafter attaching a metal foil or metal foils 10 $\mu$m or more in thickness having a chemical composition according to any one of the items (1) to (5) to a part or parts of any one or more of welded portions, brazed portions and structurally gapped portions contacting the components on the outer surface.

(13) A method for producing a fuel tank or a fuel pipe excellent in corrosion resistance according to the item (12), characterized by forming a layer of an organic or inorganic substance which suppresses the elution of the metal on the surface of a metal foil after the metal foil is attached.

(14) A method for producing a fuel tank or a fuel pipe excellent in corrosion resistance characterized by: subjecting a steel sheet or a steel pipe containing Cr of 9.0 to 25.0 mass %, which is used as the base material, to a cold plastic working; joining or fixing components; and thereafter thermally spraying a metal layer or metal layers 10 $\mu$m or more in thickness having a chemical composition according to any one of the items (1) to (5) to a part or parts of any one or more of welded portions, brazed portions and structurally gapped portions contacting the components on the outer surface.

(15) A method for producing a fuel tank or a fuel pipe excellent in corrosion resistance according to the item (14), characterized by forming a layer of an organic or inorganic substance which suppresses the elution of the metal on the surface of or inside a thermally sprayed metal layer after the metal layer is thermally sprayed.

(16) A method for producing a fuel tank or a fuel pipe excellent in corrosion resistance characterized by: subjecting a steel sheet or a steel pipe containing Cr of 9.0 to 25.0 mass %, which is used as the base material, to a cold plastic working; joining or fixing components; and thereafter coating a part or parts of any one or more of welded portions, brazed portions and structurally gapped portions contacting the components on the outer surface with a film or films 10 $\mu$m or more in thickness, each of which consists of metal powder or particles 1 to 100 $\mu$m in average grain size having a chemical composition according to any one of the items (1) to (5) and a resin and has a metal content of 75 mass % or more.

(17) A method for producing a fuel tank or a fuel pipe excellent in corrosion resistance characterized by: subjecting a steel sheet or a steel pipe containing Cr of 9.0 to 25.0 mass %, which is used as the base material, to a cold plastic working; joining or fixing components; and thereafter forming a coating film or coating films 10 $\mu$m or more in thickness having a metal content of 75 mass % or more by coating a part or parts of any one or more of welded portions, brazed portions and structurally gapped portions contacting the components on the outer surface with a paint consisting of metal powder or particles 1 to 100 $\mu$m in average grain size having a chemical composition according to any one of the items (1) to (5) and an isocyanate resin.

BEST MODE FOR CARRYING OUT THE INVENTION

Figure 1A:
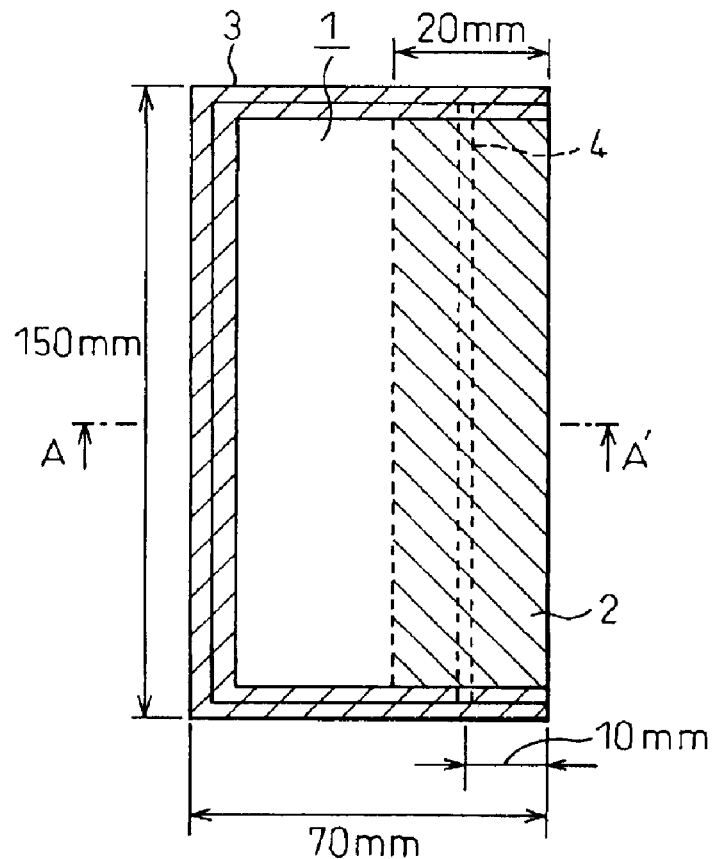
FIG. 1(a) shows an example of a corrosion test piece simulating a flange portion of a fuel tank wherein the layers of a conductive adhesive are formed and metal foils are attached.

The present invention is hereafter explained in detail.

In the first place, a steel sheet or a steel pipe containing Cr of 9 to 25% is used as the base material for a fuel tank or a fuel pipe according to the present invention.

Cr is the principal element which governs the corrosion resistance of a base material. When its content is below 9%, the effect of an attached metal on raising the pH value is not obtained sufficiently and the corrosion resistance of the outer surface becomes insufficient. On the other hand, since Cr is a solid solution hardening element, when its content exceeds 25%, the ductility of the base material is deteriorated and sufficient cold workability is not obtained. For this reason, the Cr content of a base material is limited to 9 to 25%.

Alloying elements other than Cr, such as Ni, Mo and Cu, may appropriately be added according to the prior arts. However, even when these elements are added, it is a necessary condition that the Cr content is within the above range.

A steel sheet or a steel pipe containing Cr in an amount within the above-mentioned range is formed into a fuel tank or a fuel pipe through a cold plastic working such as pressing, bending, pipe expansion and drawing, then, a welding work such as seam welding, spot welding and projection welding or a brazing work, and, finally, usual forming and assembly processes such as the attachment of hardware. It is provided that an anticorrosive treatment is applied to the outer surface, which is exposed to a salt damage environment, of the fuel tank or the fuel pipe after completing the above forming work. In particular, as the sensitivity to local corrosion such as pitting corrosion, crevice corrosion and SCC is high at a welded portion, a brazed portion and a structurally gapped portion contacting hardware, it is provided as a required condition that an anticorrosive treatment is applied at least to a part or parts of these portions.

At a structurally gapped portion, when the opening of the gap is sufficiently large, it is desirable to apply an anticorrosive treatment not only to the outside of the gap but also to the inside thereof. Besides the above, it is also desirable to apply an anticorrosive treatment to non-welded portions where residual tensile stress is high and the like. Here, the expressions "a welded portion" and "a brazed portion" cover the portions where passivated films have been destroyed and the color has been changed by the heat of the welding or the brazing, the structurally gapped portions formed by the welding or the brazing, and the brazing filler material.

Next, a metal to be attached is explained.

The anticorrosion of an outer surface in the present invention makes use of two effects, namely a cathodic protection effect and the effect of raising the pH value at the surface of a base material. For this reason, a metal to be attached must at least be sufficiently baser than a stainless steel base material. As a guideline, the present invention sets forth as a necessary condition that the electrode potential of a metal to be attached in a 5%-NaCl aqueous solution at 30° C. is −0.4 V or less relative to a saturated calomel electrode.

Here, the value represented by the maximum value of the potential of a metal measured for a period of 24 h. is defined as the potential of the metal. The potential of −0.4 V corresponds to the potential at which a corroded crevice of a stainless steel is passivated again. Therefore, by attaching a metal having a potential equal to or lower than the value, the potential of a stainless steel base material is lowered to a potential equal to or lower than the potential at which a corroded crevice of the stainless steel is passivated again, and, as a consequence, the growth of the crevice corrosion is suppressed.

Zn, Al and Mg are named as the typical metal elements satisfying the above condition. Among them, Zn is excellent in the effect of raising the pH value on the surface of a stainless steel base material as well as in the cathodic protection effect. When Zn is attached, since basic zinc carbonate generated by the self corrosion of Zn raises the pH value up to the alkaline range, the corrosion of a base material is suppressed even in the areas beyond the range which the cathodic protection current can reach, as far as the rust liquor of Zn extends to the areas. For this reason, Zn is the most effective metal as a means for achieving the object of the present invention.

Al is a metal baser than a stainless steel in a salt damage environment and assures a cathodic protection effect. Since the self corrosion rate of Al is lower than that of Zn, Al is a useful metal for maintaining the cathodic protection effect for a long period of time. However, it is inferior to Zn in the effect of raising a pH value and, for this reason, it is desirable to use Al in the form of an alloy with metals such as Zn and Mg when the portions beyond the range which an cathodic protection current can reach are required to be protected from corrosion.

Mg is a metal baser than Zn and is suitable for the cathodic protection under the condition of a thin liquid film having high electric resistance. However, as the self corrosion rate of Mg is higher than that of Zn, Mg is consumed in a short period of time though it can make an cathodic protection current reach a wider area. In addition, Mg is inferior to Zn in the effect of raising a pH value. For this reason, it is desirable to use Mg in the form of an alloy with metals such as Zn and Al for securing the effects of cathodic protection and of raising a pH value for a long period of time.

As a metallic material suitable for lowering the self corrosion rate while both the cathodic protection effect and the pH value raising effect are maximized, an alloy containing Zn of 10% or more with the balance consisting of Al, a mixture of Al, Mg and Si, that of Al, Mg and Sn or that of Al, Mg, Si and Sn is effective. For the purpose of sufficiently securing the cathodic protection effect and the pH value raising effect by the rust liquor of Zn, it is necessary that the minimum value of the Zn content in the alloy is 10%.

In an alloy of an Al—Mg—Si—Zn system, an Al—Mg—Sn—Zn system or an Al—Mg—Si—Sn—Zn system, Mg forms water-soluble intermetallic compounds with Si or Sn, exhibits a pH value raising effect, forms an anticorrosive film on a base material, and thus suppresses the corrosion. For this reason, it is specified that, when Mg is used as an alloying element, it has to be used together with Si, Sn, Al and Zn and its content has to be limited to an amount sufficient for forming the intermetallic compounds. In this sense, an adequate content of Mg is determined to be 1 to 10%.

Si and Sn form the water-soluble intermetallic compounds $Mg_2Si$ and $Mg_2Sn$, respectively, together with Mg, and work effectively for anticorrosion. For this reason, when Mg is used, Si and Sn are added together. It is specified that their contents are limited within the range necessary for forming the intermetallic compounds with Mg. In this sense, the adequate contents of Si and Sn are determined to be 1 to 10%, respectively.

The manner of attaching a metal or an alloy having the composition described above is not particularly specified and any manner is acceptable as far as the electric conductivity is secured between the metal or the alloy and the outer surface of a fuel tank or a fuel pipe. Methods such as bonding or adhesion with an organic adhesive containing an electrically conductive substance, thermal spraying, coating with a paint containing metal powder, welding, brazing, and mechanical fixing using clips or bolts and nuts are commonly employed. As the desirable manners, nominated are: the method of attaching a metal or an alloy in the form of foil to a portion where corrosion is likely to occur; the method of forming a laminated film by applying a metal or an alloy in the form of powder or particles to a portion where corrosion is likely to occur; and the method of forming a coating film by applying a paint containing a metal or an alloy of high concentration.

When a metal foil is used for the anticorrosion of a portion where corrosion is likely to occur, such as a welded portion or a gapped portion, the thickness of the foil is required to be 10 $\mu$m or more, desirably 50 $\mu$m or more, from the viewpoint of securing long term anticorrosion. Further, for suppressing a corrosion loss, it is desirable to form a layer of an organic or inorganic substance which insulates the foil surface from the environment. As a layer of an organic substance, a generally used resin system paint is well accepted and, as a layer of an inorganic substance, a chromate film or the like is effective.

When a metal or an alloy is used in the form of powder or particles for forming a coating film having a laminated structure, the specific surface area of the attached metal relative to the base material tends to be larger than that in the form of foil and, therefore, a better anticorrosive effect is obtained. The thermal spraying method is suitable for easily forming a film from powder or particles. In this case, it is necessary that the thickness of the film is at least 10 $\mu$m or more, desirably 50 $\mu$m or more.

In the above case, the corrosion loss of the film is large in proportion as the specific surface area is large. Therefore, from the viewpoint of extending the service life of the film against the corrosion, it is desirable to form a layer of an organic or inorganic substance for insulating the film surface and the particles inside the film from the environment. As a layer of an organic substance, a commonly used resin system paint is well accepted, and, as a layer of an inorganic substance, a chromate film or the like is effective. It is not necessary to specify the means of thermal spraying, and the commonly employed flame spraying method or the like is sufficiently acceptable.

The method of forming a coating film with a paint containing metal powder at a portion where corrosion is likely to occur is most suitable as a simplified method for securing electric conductivity and suppressing the corrosion loss of the attached metal. In this case, it is necessary that the content of the metal powder in the coating film for securing the electric conductivity is 75 mass % or more. An adequate range of the grain size of the metal powder contained in the coating film is 1 to 100 $\mu$m in terms of average grain size.

If the grain size is too large, the coating workability is lowered and, if it is too small, the metal powder is consumed quickly and the anticorrosive effect is lowered. A more desirable grain size of the metal powder is 2 to 20 μm. The thickness of a coating film is required to be at least 10 μm or more, preferably 50 μm or more.

A resin of an epoxy system or an urethane system is desirable as the resin component of a paint from the viewpoint of securing the good adhesiveness of a coating film and, among these, the urethane system resin excellent especially in the waterproof adhesiveness is most suitable.

When an epoxy system resin is used, it is necessary to roughen the substrate surface by blasting, sand paper polishing or the like for securing a good adhesiveness. However, when an urethane system resin is used, it is not necessary to roughen the surface since the urethane system resin is excellent in adhesiveness. Therefore, an urethane system resin is suitable for producing a fuel tank or a fuel pipe from the viewpoint of productivity.

An urethane resin is produced through the polymerization of isocyanate with a compound having a hydroxyl group such as polyol or water. From the viewpoint of coating workability, it is desirable to use a single liquid type resin composed of an isocyanate system resin that hardens through the polymerization with the humidity in the atmosphere. In this case, an adequate amount of a hardening accelerator such as amine may be added as required for making the hardening time shorter.

It is not necessary to specify the coating means, and ordinary spray coating or similar is generally applicable.

EXAMPLES

The present invention is hereafter explained in further detail based on examples.

Example 1

Figure 1B:
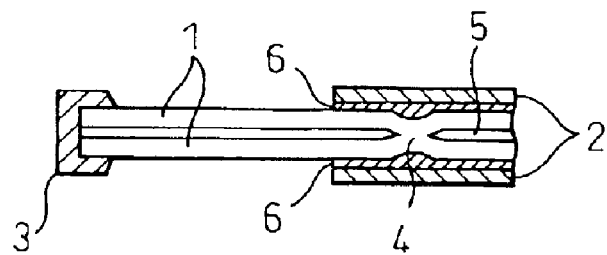
FIG. 1(b) is a sectional view taken on line A–A' of FIG. 1(a).

Seam-welded test pieces having the shape and the dimension shown in FIG. 1 simulating a flange portion of a fuel tank were prepared using steel sheets 0.8 mm in thickness having the chemical compositions shown in Table 1. In the figure, the reference numeral 1 indicates the two specimen steel sheets, and the reference numeral 2 the alloy foils attached to the specimen steel sheets 1. The area shaded with oblique lines on the right-hand side of FIG. 1(a) indicates the area where the foils are attached. The sectional view taken on line A–A' of FIG. 1(a) is shown in FIG. 1(b). The reference numeral 3 indicates the seal of the specimen steel sheets 1, the reference numeral 4 the welded portion of the specimen steel sheets 1, the reference numeral 5 the gapped portion between the two specimen steel sheets 1, and the reference numeral 6 the layers of electrically conductive adhesives which bond the alloy foils 2 to the specimen steel sheets 1.

Alloy foils 2 (0.2 mm in thickness) of different chemical compositions were bonded to the welded portions 4 with the electrically conductive adhesives 6, and the test pieces were subjected to the corrosion tests. In some of the corrosion tests, the test pieces produced by forming urethane-epoxy resin system coating films on the surfaces of the alloy foils 2 were used.

In each of the corrosion tests, a JASO mode cyclic corrosion test (one cycle was composed of 5%-NaCl aqueous solution spraying at 35° C. for 2 h., forced drying at 60° C. for 4 h. and exposing in humid atmosphere of 90% RH at 50° C. for 2 h.) was carried out for 300 cycles simulating a salt damage environment to which the outer surface of a fuel tank was exposed.

After finishing the tests, the degrees of the local corrosion at the welded portions and in the insides of the gaps and the corrosion thickness losses of the alloy foils were evaluated. When the ratio of the depth of the local corrosion and that of the thickness loss by the consumption of an alloy foil to the respective initial thickness were 20% or less respectively, the test piece was evaluated as good, when each of the ratios exceeded 60%, the test piece was evaluated as unusable, and when each of the ratios was 20 to 60%, the test piece was evaluated as risky.

Table 2 shows the conditions and the results of the tests. In the invented cases Nos. 1 to 12, satisfactory anticorrosive effects were obtained at the welded portions and the gapped portions. Although the consumption of the alloy was large in No. 8, the anticorrosive effect could be prolonged by applying the surface coating and suppressing the consumption of Zn as it was seen in No. 1.

In contrast, in the comparative cases Nos. 101 to 104, the test pieces were subjected to the tests in an as-welded state, the corrosion at the welded portions and the gapped portions was significant, and SCC occurred in the cases where γ system stainless steels were used as the base materials.

Example 2

Figure 2A:
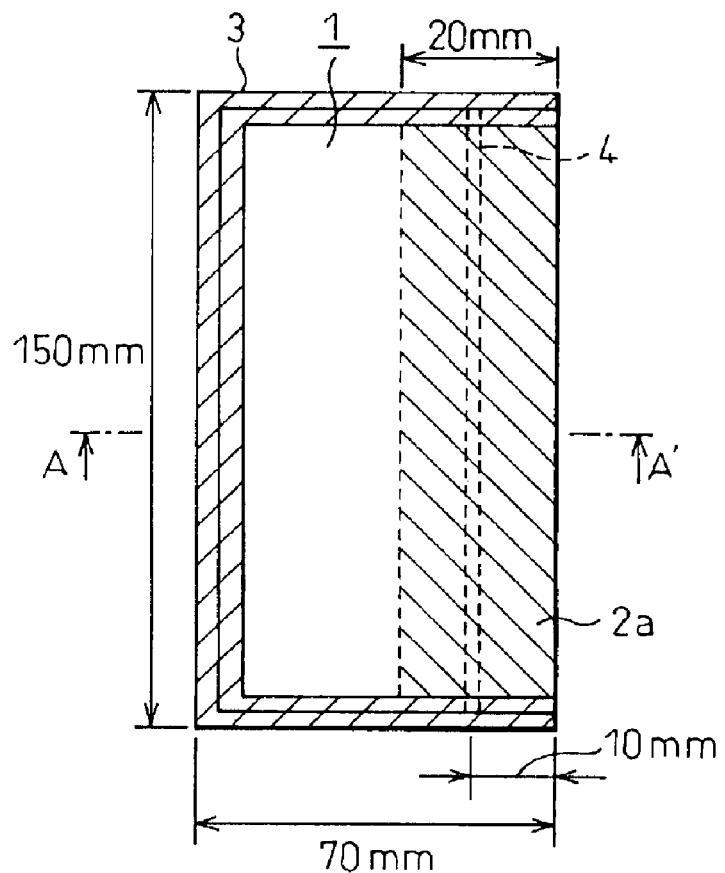
FIG. 2(a) shows the shape and dimension of a corrosion test piece simulating a flange portion of a fuel tank.
Figure 2B:
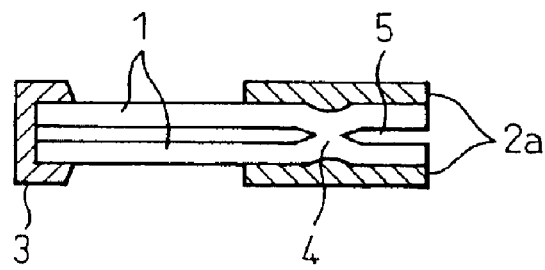
FIG. 2(b) is a sectional view taken on line A–A' of FIG. 2(a).

Seam-welded test pieces having the shape and the dimension shown in FIG. 2 simulating a flange portion of a fuel tank were prepared using steel sheets 0.8 mm in thickness having the chemical compositions shown in Table 1, in the same manner as in Example 1. In FIG. 2, the reference numeral 1 indicates the two specimen steel sheets, and the reference numeral 2a the thermally sprayed alloy layers or the coating films of a paint containing alloy powder formed on the specimen steel sheets 1. The area shaded with oblique lines on the right-hand side of FIG. 2(a) indicates the area where the thermal spraying or the coating was applied. The sectional view taken on line A–A' of FIG. 2(a) is shown in FIG. 2(b). The reference numeral 3 indicates the seal of the specimen steel sheets 1, the reference numeral 4 the welded portion of the specimen steel sheets 1, and the reference numeral 5 the gapped portion between the two specimen steel sheets 1.

The thermal spraying was carried out by the flame spraying method in a normal atmosphere, and the thickness of the thermally sprayed layers was 8 to 200 μm. Some of the test pieces were subjected to the treatment of the chromate of a chromic acid and silica system after the thermal spraying. The coating weight was 20 mg in terms of Cr equivalent per 1 $m^2$ of the thermally sprayed surface.

The coating was carried out by spraying the paints composed of the alloy powders (3 μm in average grain size) of different chemical compositions and isocyanate and thereafter hardening the paints indoors at the room temperature, and the coating films 8 to 100 μm in thickness and having the alloy contents of 68 to 85 mass % therein were formed. The methods of the corrosion tests and the evaluation were the same as those employed in Example 1.

Table 3 shows the conditions and the results of the tests of the thermally sprayed test pieces. In the invented cases Nos. 21 to 32, satisfactory anticorrosive effects were obtained at the welded portions and the gapped portions. Although the consumption of the thermally sprayed layer was large in No. 28, the anticorrosive effect could be prolonged by applying the chromate treatment after the thermal spraying and suppressing the consumption of Zn as it was seen in No. 21.

In contrast, in the comparative case No. 201, the thickness of the thermally sprayed layer was outside the range of the present invention and a sufficient anticorrosive effect was not obtained. In the comparative case No. 202, the chemical composition of the base material was outside the range of the present invention and the anticorrosion at the gapped portion was insufficient.

Table 4 shows the conditions and the results of the tests of the coated test pieces. In the invented cases Nos. 41 to 52, satisfactory anticorrosive effects were obtained at the welded portions and the gapped portions.

In contrast, the contents of the metals in the coating films in the comparative cases Nos. 301 to 303, the coating film thickness in the comparative case No. 304 and the chemical composition of the base material in the comparative case No. 305 were outside the respective ranges according to the present invention and, for this reason, the anticorrosion was insufficient either at the welded portions or at the gapped portions.

Example 3

Test pieces formed by silver brazing and having the shapes and the dimensions shown in FIGS. 3 and 4 simulating a joint of a fuel pipe with a breather tube were prepared using the steel pipes having the chemical compositions shown in Table 1 as the base materials.

Figure 3A:
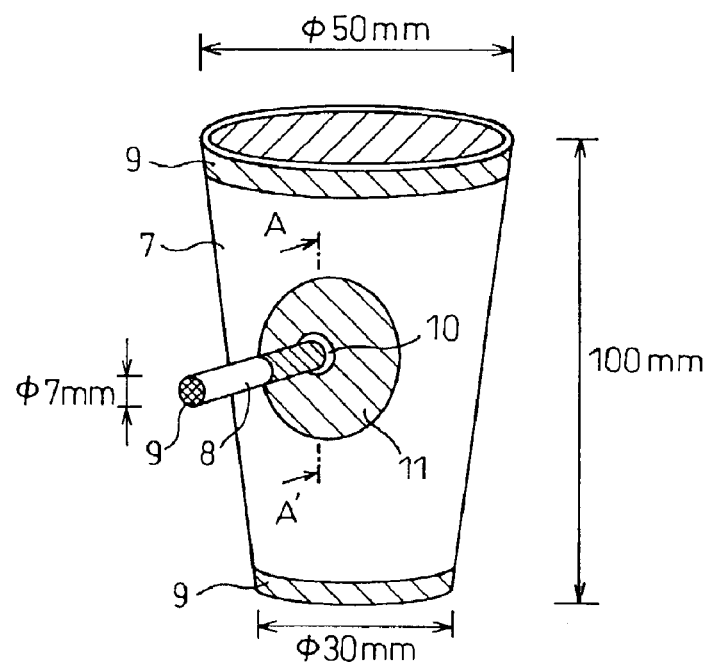
FIG. 3(a) shows an example of the shape of a corrosion test piece simulating a brazed portion of a fuel pipe jointed with a breather tube wherein a metal foil is attached.
Figure 3B:
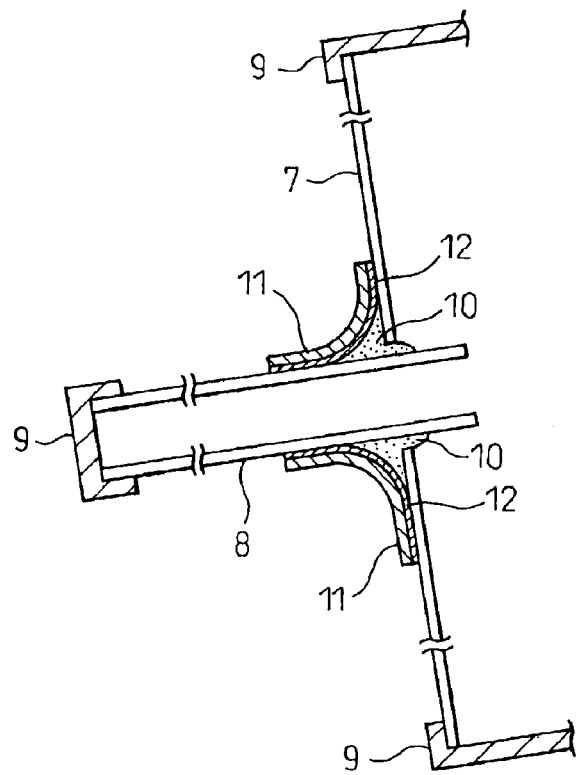
FIG. 3(b) is a sectional view taken on line A–A' of FIG. 3(a).

FIG. 3 shows the shape of the test pieces when an alloy foil is attached to the silver-brazed portion. In the figure, the reference numeral 7 indicates the fuel pipe body of a test piece, the reference numeral 8 the breather tube of the same material as the fuel pipe 7, the reference numeral 9 the seals at the pipe ends, the reference numeral 10 the silver-brazed portion, and the reference numeral 11 the alloy foil. The area shaded with oblique lines at the center of FIG. 3(a) indicates the area where the alloy foil is attached. The sectional view taken on line A–A' of FIG. 3(a) is shown in FIG. 3(b). In FIG. 3(b), the reference numeral 10 indicates the silver braze, the reference numeral 11 the alloy foil, and the reference numeral 12 the electrically conductive adhesive layer bonding the alloy foil to the silver-brazed portion.

Figure 4A:
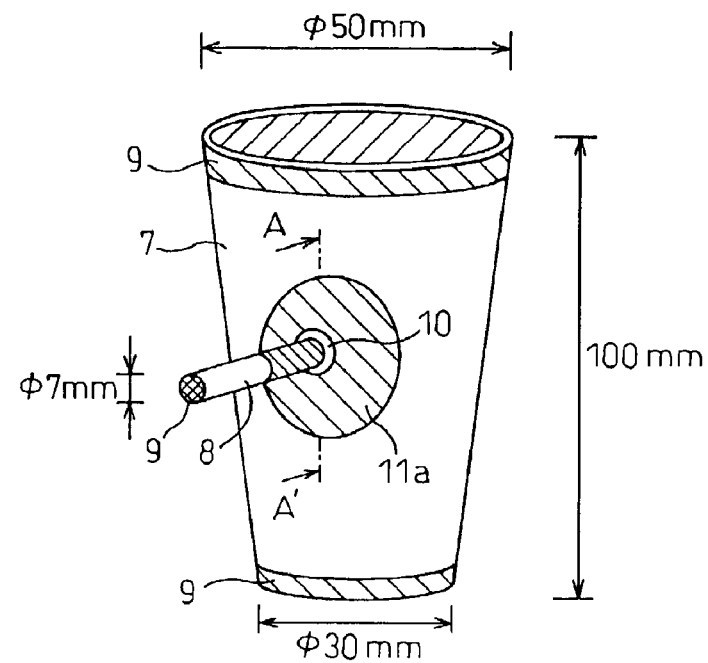
FIG. 4(a) shows another example of the shape of a corrosion test piece simulating a brazed portion of a fuel pipe jointed with a breather tube wherein a thermally sprayed layer or a coating film is formed.
Figure 4B:
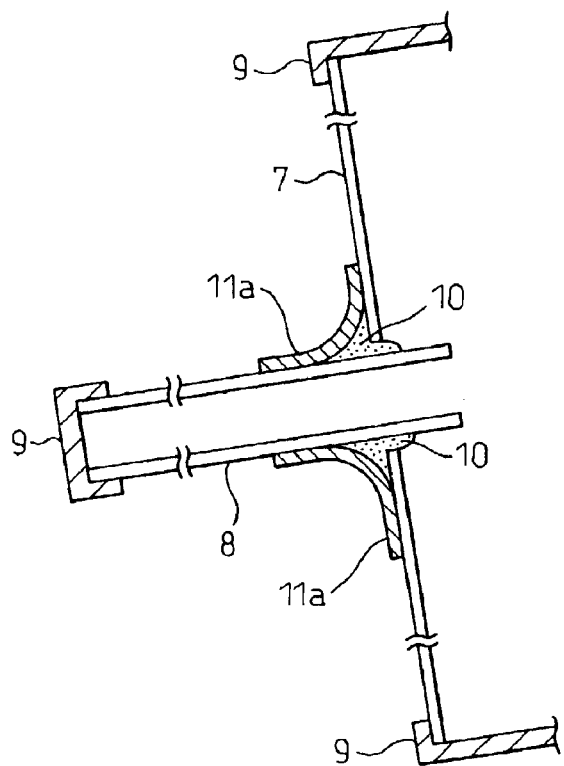
FIG. 4(b) is a sectional view taken on line A–A' of FIG. 4(a).

FIG. 4 shows the shape of test pieces when the alloy is attached to the silver-brazed portion by thermal spraying or painting. In the figure, the reference numeral 7 indicates the fuel pipe body of a test piece, the reference numeral 8 the breather tube of the same material as the fuel pipe 7, the reference numeral 9 the seals at the pipe ends, the reference numeral 10 the silver-brazed portion, and the reference numeral 11a the thermally sprayed or painted portion. The sectional view taken on line A–A' of FIG. 4(a) is shown in FIG. 4(b). In FIG. 4(b), the reference numeral 10 indicates the silver braze, and the reference numeral 11a the thermally sprayed layer or the coated film.

The following test pieces were prepared and subjected to the corrosion tests: those wherein alloy foils (0.2 mm in thickness) of different chemical compositions were bonded to the silver-brazed portions with the electrically conductive adhesive; those wherein the alloys of different chemical compositions were thermally sprayed to the thickness of 0.1 mm; and those wherein the paints composed of the powder (3 μm in average grain size) of alloys of different chemical compositions and isocyanate were sprayed and the coating films 80 μm in thickness having an alloy content of 80% therein were formed. In some of the corrosion tests, the test pieces produced by forming urethane-epoxy resin system coating films on the surfaces of the alloy foils or the thermally sprayed alloy layers were used. The methods of the corrosion tests and the evaluation were the same as those in Example 1.

Table 5 shows the conditions and results of the tests. In the invented cases Nos. 61 to 72, satisfactory anticorrosive effects were obtained at the welded portions and the gapped portions.

In contrast, in the comparative cases Nos. 401 to 405, the test pieces were subjected to the tests in an as-silver-brazed state, and the local corrosion and/or SCC occurred at the brazed portions. In the comparative case No. 405, a sufficient effect was not obtained even though the anticorrosive treatment was applied, because the chemical composition of the base material was outside the range of the present invention.

TABLE 1

| | | Chemical composition of test piece (in mass %) | | | | | | | | |
|---|---|---|---|---|---|---|---|---|---|---|
| Reference character | Classification | C | Si | Mn | P | S | Cu | Cr | Ni | Mo |
| A | α system | 0.0051 | 0.05 | 0.05 | 0.015 | 0.0011 | 0.01 | 17.16 | 0.02 | 1.19 |
| B | γ system | 0.0215 | 0.38 | 0.87 | 0.016 | 0.0012 | 0.01 | 18.08 | 8.37 | 0.11 |
| C | α system | 0.0041 | 0.17 | 0.14 | 0.023 | 0.0021 | 0.02 | 19.18 | 0.11 | 1.87 |
| D | γ system | 0.0331 | 1.43 | 1.07 | 0.015 | 0.0011 | 2.06 | 17.25 | 6.85 | 0.21 |
| E | Comparative steel | 0.0023 | 0.02 | 0.01 | 0.001 | 0.0005 | 0.01 | 8.85 | 0.01 | 0.01 |

TABLE 2

Evaluation result of seam-welded test piece to which foil is bonded

| Classification | No. | Test piece material | Alloy composition (in mass %) Zn | Al | Mg | Si | Sn | Electrode potential of alloy (V vs SCE) | Thickness of coating film on alloy surface (μ) | Local corrosion at welded portion *1) | Local corrosion at gapped portion *1) | Occurrence of SCC at welded portion and gapped portion | Consumption of alloy *1) | Overall evaluation |
|---|---|---|---|---|---|---|---|---|---|---|---|---|---|---|
| Invented case | 1 | A | 100 | 0 | 0 | 0 | 0 | -1.28 | 2.5 | ○ | ○ | Not occurred | ○ | ○ |
| | 2 | A | 10 | 90 | 0 | 0 | 0 | -0.98 | — | ○ | ○ | Not occurred | ○ | ○ |
| | 3 | A | 45 | 55 | 0 | 0 | 0 | -1.10 | — | ○ | ○ | Not occurred | ○ | ○ |
| | 4 | A | 30 | 58 | 6 | 6 | 0 | -1.10 | — | ○ | ○ | Not occurred | ○ | ○ |
| | 5 | A | 25 | 57 | 6 | 6 | 6 | -1.05 | — | ○ | ○ | Not occurred | ○ | ○ |
| | 6 | B | 15 | 85 | 0 | 0 | 0 | -1.02 | — | ○ | ○ | Not occurred | ○ | ○ |
| | 7 | B | 45 | 48 | 2 | 5 | 0 | -1.11 | — | ○ | ○ | Not occurred | ○ | ○ |
| | 8 | B | 100 | 0 | 0 | 0 | 0 | -1.28 | — | ○ | ○ | Not occurred | ○ | ○ |
| | 9 | C | 0 | 100 | 0 | 0 | 0 | -0.81 | — | ○ | ○ | Not occurred | ○ | ○ |
| | 10 | C | 100 | 0 | 0 | 0 | 0 | -1.28 | — | ○ | ○ | Not occurred | ○ | ○ |
| | 11 | D | 10 | 10 | 80 | 0 | 0 | -1.31 | 2.1 | ○ | ○ | Not occurred | ○ | ○ |
| | 12 | D | 100 | 0 | 0 | 0 | 0 | -1.28 | — | ○ | ○ | Not occurred | ○ | ○ |
| Comparative case | 101 | A | Tested as welded | | | | | — | — | X | X | Not occurred | — | X |
| | 102 | B | Tested as welded | | | | | — | — | Δ | Δ | Occurred | — | X |
| | 103 | C | Tested as welded | | | | | — | — | X | X | Not occurred | — | X |
| | 104 | D | Tested as welded | | | | | — | — | Δ | Δ | Occurred | — | X |

*1) ○: Ratio of maximum corrosion depth to initial thickness is 20% or less.
Δ: Ratio of maximum corrosion depth to initial thickness is over 20% to 60% or less.
X: Ratio of maximum corrosion depth to initial thickness is over 60%.

▒ : Outside the range of present invention

TABLE 3

Evaluation result of seam-welded test piece to which thermal spraying is applied

| Classification | No. | Test piece material | Method of attaching | Chemical composition of attached metal (in mass %) Zn | Al | Mg | Si | Sn | Electrode potential of alloy (V vs SCE) | Thickness of thermally sprayed layer (μ) | Chromate treatment after thermal spraying | Local corrosion at welded portion *1) | Local corrosion at gapped portion *1) | Occurrence of SCC at welded portion and gapped portion | Consumption of thermally sprayed layer *1) | Overall evaluation |
|---|---|---|---|---|---|---|---|---|---|---|---|---|---|---|---|---|
| Invented case | 21 | A | Thermal spraying | 100 | 0 | 0 | 0 | 0 | -1.28 | 180 | Applied | ○ | ○ | Not occurred | ○ | ○ |
| | 22 | A | ↓ | 10 | 90 | 0 | 0 | 0 | -0.98 | 100 | Applied | ○ | ○ | Not occurred | ○ | ○ |
| | 23 | A | ↓ | 45 | 55 | 0 | 0 | 0 | -1.10 | 100 | Not applied | ○ | ○ | Not occurred | ○ | ○ |
| | 24 | A | ↓ | 30 | 58 | 6 | 6 | 0 | -1.10 | 95 | Not applied | ○ | ○ | Not occurred | ○ | ○ |
| | 25 | A | ↓ | 25 | 57 | 6 | 6 | 6 | -1.05 | 120 | Not applied | ○ | ○ | Not occurred | ○ | ○ |
| | 26 | B | ↓ | 15 | 85 | 0 | 0 | 0 | -1.02 | 85 | Not applied | ○ | ○ | Not occurred | ○ | ○ |
| | 27 | B | ↓ | 45 | 48 | 2 | 5 | 0 | -1.11 | 110 | Not applied | ○ | ○ | Not occurred | ○ | ○ |
| | 28 | B | ↓ | 100 | 0 | 0 | 0 | 0 | -1.28 | 120 | Not applied | ○ | ○ | Not occurred | Δ | ○ |
| | 29 | C | ↓ | 0 | 100 | 0 | 0 | 0 | -0.81 | 80 | Applied | ○ | ○ | Not occurred | ○ | ○ |
| | 30 | C | ↓ | 100 | 0 | 0 | 0 | 0 | -1.28 | 200 | Not applied | ○ | ○ | Not occurred | ○ | ○ |
| | 31 | D | ↓ | 10 | 10 | 80 | 0 | 0 | -1.31 | 120 | Applied | ○ | ○ | Not occurred | ○ | ○ |
| | 32 | D | ↓ | 100 | 0 | 0 | 0 | 0 | -1.28 | 110 | Applied | ○ | ○ | Not occurred | ○ | ○ |
| Comparative case | 201 | A | ↓ | 100 | 0 | 0 | 0 | 0 | -1.28 | ▒ | Not applied | X | X | Not occurred | X | X |
| | 202 | ▒E▒ | ↓ | 100 | 0 | 0 | 0 | 0 | -1.28 | 120 | Applied | X | X | Not occurred | — | X |

*1) ○: Ratio of maximum corrosion depth to initial thickness is 20% or less.
Δ: Ratio of maximum corrosion depth to initial thickness is over 20% to 60% or less.
X: Ratio of maximum corrosion depth to initial thickness is over 60%.

▒ : Outside the range of present invention

TABLE 4

Evaluation result of seam-welded test piece to which coating is applied

| Classification | No. | Test piece material | Chemical composition of alloy powder (in mass %) | | | | | Electrode potential of alloy (V vs SCE) | Thickness of coating film (μm) | Alloy content in coating film (%) | Local corrosion at welded portion *1) | Local corrosion at gapped portion *1) | Occurrence of SCC at welded portion and gapped portion | Overall evaluation |
|---|---|---|---|---|---|---|---|---|---|---|---|---|---|---|
| | | | Zn | Al | Mg | Si | Sn | | | | | | | |
| Invented case | 41 | A | 100 | 0 | 0 | 0 | 0 | -1.28 | 80 | 75 | ○ | ○ | Not occurred | ○ |
| | 42 | A | 10 | 90 | 0 | 0 | 0 | -0.98 | 80 | 78 | ○ | ○ | Not occurred | ○ |
| | 43 | A | 45 | 55 | 0 | 0 | 0 | -1.10 | 75 | 80 | ○ | ○ | Not occurred | ○ |
| | 44 | A | 30 | 58 | 6 | 6 | 0 | -1.10 | 70 | 85 | ○ | ○ | Not occurred | ○ |
| | 45 | A | 25 | 57 | 6 | 6 | 6 | -1.05 | 60 | 80 | ○ | ○ | Not occurred | ○ |
| | 46 | B | 15 | 85 | 0 | 0 | 0 | -1.02 | 80 | 80 | ○ | ○ | Not occurred | ○ |
| | 47 | B | 45 | 48 | 2 | 5 | 0 | -1.11 | 85 | 79 | ○ | ○ | Not occurred | ○ |
| | 48 | B | 100 | 0 | 0 | 0 | 0 | -1.28 | 100 | 78 | ○ | ○ | Not occurred | ○ |
| | 49 | C | 0 | 100 | 0 | 0 | 0 | -0.81 | 80 | 78 | ○ | ○ | Not occurred | ○ |
| | 50 | C | 100 | 0 | 0 | 0 | 0 | -1.28 | 30 | 80 | ○ | ○ | Not occurred | ○ |
| | 51 | D | 10 | 10 | 80 | 0 | 0 | -1.31 | 120 | 79 | ○ | ○ | Not occurred | ○ |
| | 52 | D | 100 | 0 | 0 | 0 | 0 | -1.28 | 20 | 80 | ○ | ○ | Not occurred | ○ |
| Comparative case | 301 | A | 10 | 90 | 0 | 0 | 0 | -0.98 | 50 | 73 | X | X | Not occurred | X |
| | 302 | B | 10 | 90 | 0 | 0 | 0 | -0.98 | 50 | 73 | Δ | X | Occurred | X |
| | 303 | C | 10 | 90 | 0 | 0 | 0 | -0.98 | 50 | 73 | X | X | Not occurred | X |
| | 304 | A | 100 | 0 | 0 | 0 | 0 | -1.28 | 15 | 80 | Δ | X | Not occurred | X |
| | 305 | F | 100 | 0 | 0 | 0 | 0 | -1.28 | 80 | 80 | Δ | Δ | Occurred | X |

*1) ○: Ratio of maximum corrosion depth to initial thickness is 20% or less.

Δ: Ratio of maximum corrosion depth to initial thickness is over 20% to 60% or less.

X: Ratio of maximum corrosion depth to initial thickness is over 60%.

▒ : Outside the range of present invention

TABLE 5

Evaluation result of sliver-brazed test piece

| Classification | No. | Test Piece material | Chemical composition of alloy powder (in mass %) | | | | | Method of attaching | Local corrosion of brazed portion *1) | Occurrence of SCC at brazed portion | Overall evaluation |
|---|---|---|---|---|---|---|---|---|---|---|---|
| | | | Zn | Al | Mg | Si | Sn | | | | |
| Invented case | 61 | A | 100 | 0 | 0 | 0 | 0 | Bonding of foil | ○ | Not occurred | ○ |
| | 62 | A | 10 | 90 | 0 | 0 | 0 | Thermal spraying | ○ | Not occurred | ○ |
| | 63 | A | 45 | 55 | 0 | 0 | 0 | Coating | ○ | Not occurred | ○ |
| | 64 | A | 30 | 58 | 6 | 6 | 0 | ↓ | ○ | Not occurred | ○ |
| | 65 | A | 25 | 57 | 6 | 6 | 6 | ↓ | ○ | Not occurred | ○ |
| | 66 | B | 15 | 85 | 0 | 0 | 0 | ↓ | ○ | Not occurred | ○ |
| | 67 | B | 45 | 48 | 2 | 5 | 0 | ↓ | ○ | Not occurred | ○ |
| | 68 | B | 100 | 0 | 0 | 0 | 0 | ↓ | ○ | Not occurred | ○ |
| | 69 | C | 0 | 100 | 0 | 0 | 0 | ↓ | ○ | Not occurred | ○ |
| | 70 | C | 100 | 0 | 0 | 0 | 0 | ↓ | ○ | Not occurred | ○ |
| | 71 | D | 10 | 10 | 80 | 0 | 0 | ↓ | ○ | Not occurred | ○ |
| | 72 | D | 100 | 0 | 0 | 0 | 0 | ↓ | ○ | Not occurred | ○ |

TABLE 5-continued

Evaluation result of sliver-brazed test piece

*1) ○: Ratio of maximum corrosion depth to initial thickness is 20% or less.
  Δ: Ratio of maximum corrosion depth to initial thickness is over 20% to 60% or less.
  X: Ratio of maximum corrosion depth to initial thickness is over 60%.

 : Outside the range of present invention

Industrial Applicability

As has been explained, the present invention makes it possible to avoid the problem of local corrosion at a welded portion and a gapped portion and to obtain a fuel tank or a fuel pipe excellent in corrosion resistance. The concept of the present invention is not limitedly applied simply to the individual components of a fuel tank and a fuel pipe, but can be applied to all the members and components for an automobile the outer surfaces of which are exposed to a salt damage environment and to which a stainless steel satisfying the necessary conditions specified herein is applied.

What is claimed is:

1. A fuel tank or a fuel pipe excellent in corrosion resistance characterized by: being formed by using a steel sheet or a steel pipe containing Cr of 9.0 to 25.0 mass % as the base material; on the outer surface thereof, having any one or more of welded portions, brazed portions and structurally gapped portions contacting components; and having one or more of metals, whose electrode potential in a 5%-NaCl aqueous solution at 30° C. is −0.4 V or less relative to a saturated calomel electrode, attached to at least a part or parts of said portion(s) of the outer surface in an electrically conductive manner.

2. A fuel tank or a fuel pipe excellent in corrosion resistance according to claim 1, characterized in that a metal attached to the outer surface of the fuel tank or the fuel pipe consists of one or more of Zn, Al and Mg in terms of the substantial chemical components excluding unavoidable impurities.

3. A fuel tank or a fuel pipe excellent in corrosion resistance according to claim 1, characterized in that a metal attached to the outer surface of the fuel tank or the fuel pipe contains Zn of 10 mass % or more, with the balance substantially consisting of Al.

4. A fuel tank or a fuel pipe excellent in corrosion resistance according to claim 1, characterized in that a metal attached to the outer surface of the fuel tank or the fuel pipe contains, in mass, Zn of 10% or more and further one or more of Si of 1 to 10%, Sn of 1 to 10% and Mg of 1 to 10%, with the balance substantially consisting of Al.

5. A fuel tank or a fuel pipe excellent in corrosion resistance according to claim 4, characterized in that the metal contained in a substance attached to the outer surface of the fuel tank or the fuel pipe further contains one or more kinds of intermetallic compounds composed of Mg and Si or Mg and Sn.

6. A method for producing a fuel tank or a fuel pipe excellent in corrosion resistance characterized by: subjecting a steel sheet or a steel pipe containing Cr of 9.0 to 25.0 mass %, which is used as the base material, to cold plastic working; joining or fixing components; and thereafter attaching a metal foil or metal foils 10 μm or more in thickness having a chemical composition according to any one of claims 1 to 5 to a part or parts of any one or more of welded portions, brazed portions and structurally gapped portions contacting the components on the outer surface.

7. A method for producing a fuel tank or a fuel pipe excellent in corrosion resistance according to claim 6, characterized by forming a layer of an organic or inorganic substance which suppresses the elution of the metal on the surface of a metal foil after the metal foil is attached.

8. A method for producing a fuel tank or a fuel pipe excellent in corrosion resistance characterized by: subjecting a steel sheet or a steel pipe containing Cr of 9.0 to 25.0 mass %, which is used as the base material, to a cold plastic working; joining or fixing components; and thereafter thermally spraying a metal layer or metal layers 10 μm or more in thickness having a chemical composition according to any one of claims 1 to 5 to a part or parts of any one or more of welded portions, brazed portions and structurally gapped portions contacting the components on the outer surface.

9. A method for producing a fuel tank or a fuel pipe excellent in corrosion resistance according to claim 8, characterized by forming a layer of an organic or inorganic substance which suppresses the elution of the metal on the surface of or inside a thermally sprayed metal layer after the metal layer is thermally sprayed.

10. A method for producing a fuel tank or a fuel pipe excellent in corrosion resistance characterized by: subjecting a steel sheet or a steel pipe containing Cr of 9.0 to 25.0 mass %, which is used as the base material, to a cold plastic working; joining or fixing components; and thereafter coating a part or parts of any one or more of welded portions, brazed portions and structurally gapped portions contacting the components on the outer surface with a film or films 10 μm or more in thickness, each of which consists of metal powder or particles 1 to 100 μm in average grain size having a chemical composition according to any one of claims 1 to 5 and a resin and has a metal content of 75 mass % or more.

11. A method for producing a fuel tank or a fuel pipe excellent in corrosion resistance characterized by: subjecting a steel sheet or a steel pipe containing Cr of 9.0 to 25.0 mass %, which is used as the base material, to a cold plastic working; joining or fixing components; and thereafter forming a coating film or coating films 10 μm or more in thickness having a metal content of 75 mass % or more by coating a part or parts of any one or more of welded portions, brazed portions and structurally gapped portions contacting the components on the outer surface with a paint consisting of metal powder or particles 1 to 100 μm in average grain size having a chemical composition according to any one of claims 1 to 5 and an isocyanate resin.

12. A fuel tank or a fuel pipe excellent in corrosion resistance according to claim 1, characterized in that an attached metal is in the form of foil 10 μm or more in thickness.

13. A fuel tank or a fuel pipe excellent in corrosion resistance according to claim 12, characterized by forming a layer of an organic or inorganic substance which suppresses the elution of the metal on the surface of a metal foil.

14. A fuel tank or a fuel pipe excellent in corrosion resistance according to claim 1, characterized in that a metal attached to the outer surface of the fuel tank or the fuel pipe is in the form of thermally sprayed particles and the metal is attached as a film 10 μm or more in thickness having a laminated structure.

15. A fuel tank or a fuel pipe excellent in corrosion resistance according to claim 14, characterized by forming a layer of an organic or inorganic substance on the surface of a film having a laminated structure and being composed of metal powder or particles or in the voids in the film.

16. A fuel tank or a fuel pipe excellent in corrosion resistance according to claim 1, characterized by forming a film or films 10 μm or more in thickness, each of which consists of metal powder or particles 1 to 100 μm in average grain size and a resin and has a metal content of 75 mass % or more, on the outer surface of the fuel tank or the fuel pipe.

17. A fuel tank or a fuel pipe excellent in corrosion resistance according to claim 16, characterized in that the resin contains urethane bonds.

* * * * *